United States Patent [19]

Rushworth

[11] 3,925,965

[45] Dec. 16, 1975

[54] FUEL ROD PELLET LOADING ASSEMBLY

[75] Inventor: George E. Rushworth, Richland, Wash.

[73] Assignee: Exxon Nuclear Company Inc., Richland, Wash.

[22] Filed: Jan. 22, 1973

[21] Appl. No.: 325,723

[52] U.S. Cl.............. 53/112 R; 53/59 W; 53/26; 53/255
[51] Int. Cl... B65b 31/00; B65b 21/06; B65b 57/00
[58] Field of Search ...... 53/112, 26, 24, 59 W, 247, 53/248, 255, 258, 166, 112 B

[56] References Cited
UNITED STATES PATENTS

| | | | |
|---|---|---|---|
| 743,505 | 11/1903 | Heffner | 53/255 |
| 2,686,623 | 8/1954 | Wimmer et al. | 53/166 |
| 3,212,226 | 10/1965 | Murray et al. | 53/24 |
| 3,570,216 | 3/1971 | Frentzel | 53/248 |
| 3,624,982 | 12/1971 | Marietta, Jr. | 53/112 B |
| 3,735,550 | 5/1973 | Moore et al. | 53/112 R |

Primary Examiner—Harrison L. Hinson
Attorney, Agent, or Firm—F. Donald Paris

[57] ABSTRACT

An assembly for loading nuclear fuel pellets into a fuel rod comprising a glove box including means for weighing and measuring the fuel pellets to be loaded and having at its loading end a block for receiving the open end of a fuel rod and a fuel pellet holder spaced from the block and carrying a pellet loading spring member which bridges the space between the holder and the block. The spring member can be adjusted so that the pellets are loaded properly into the fuel rod.

13 Claims, 11 Drawing Figures

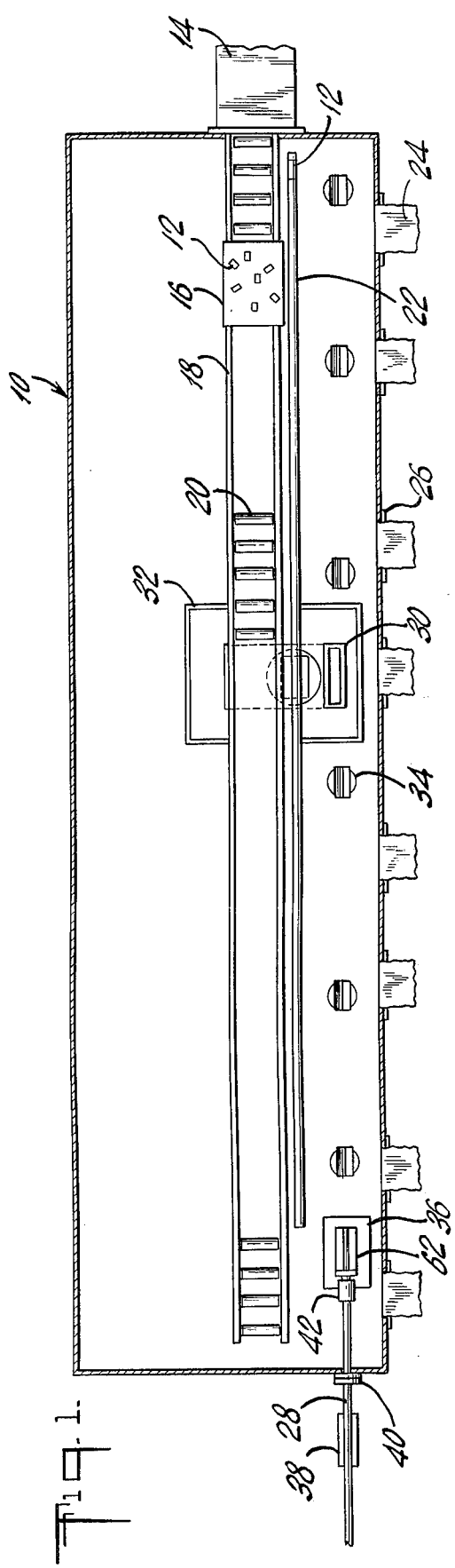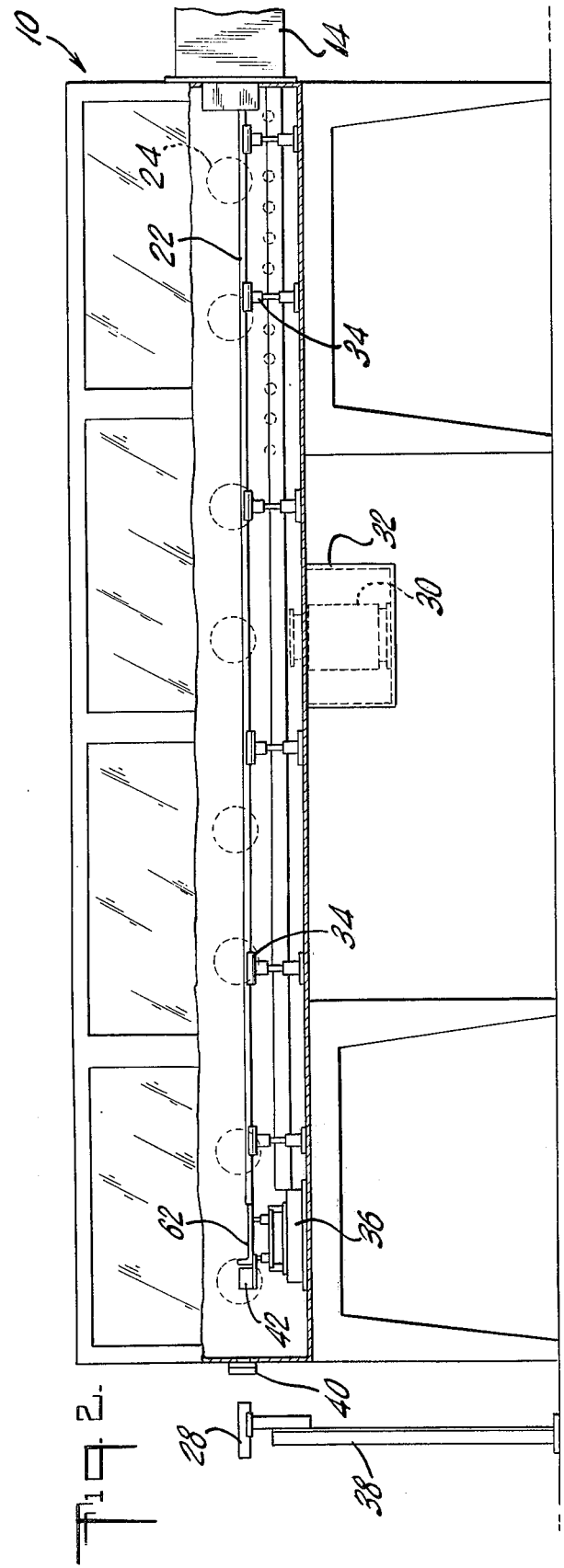

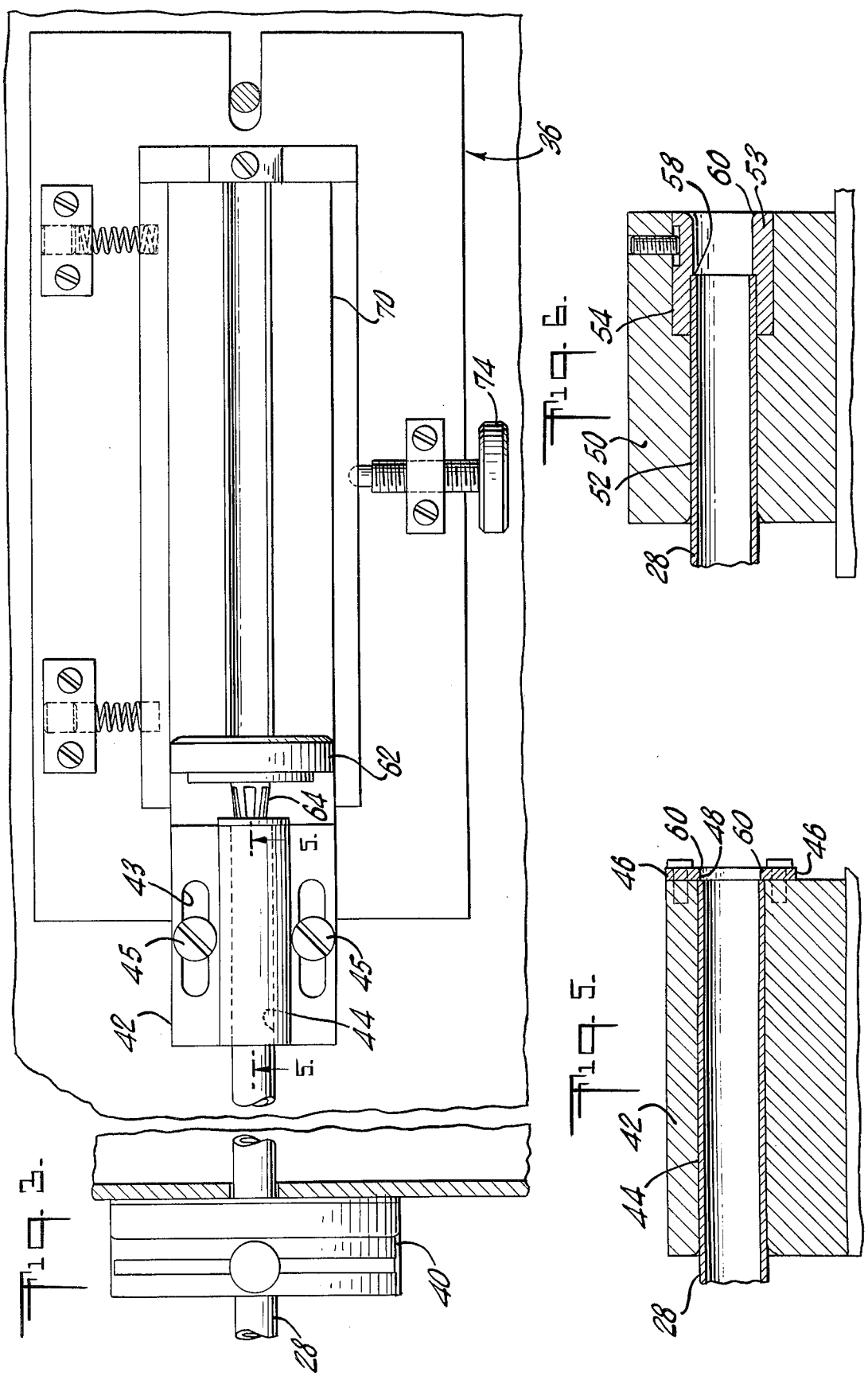

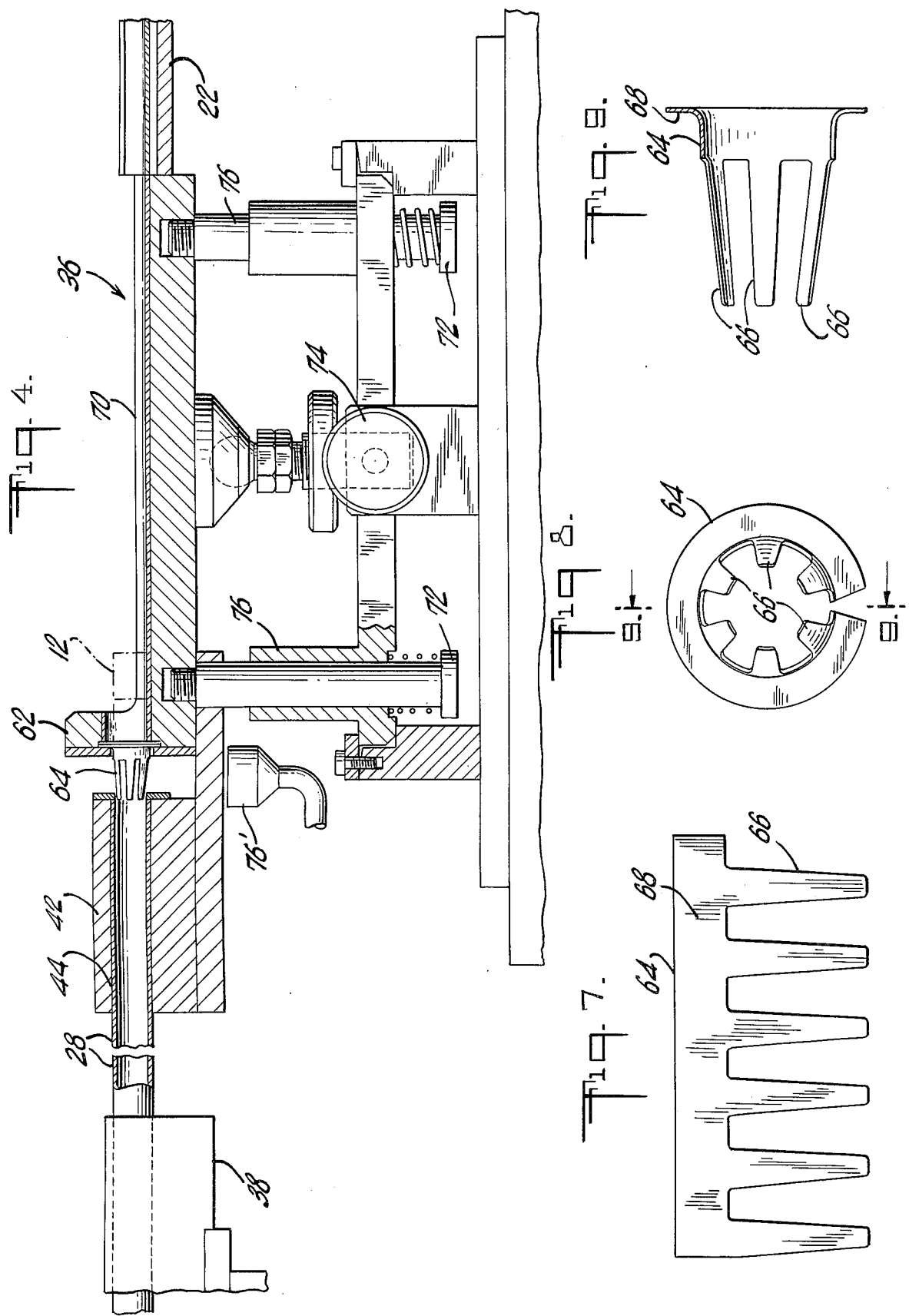

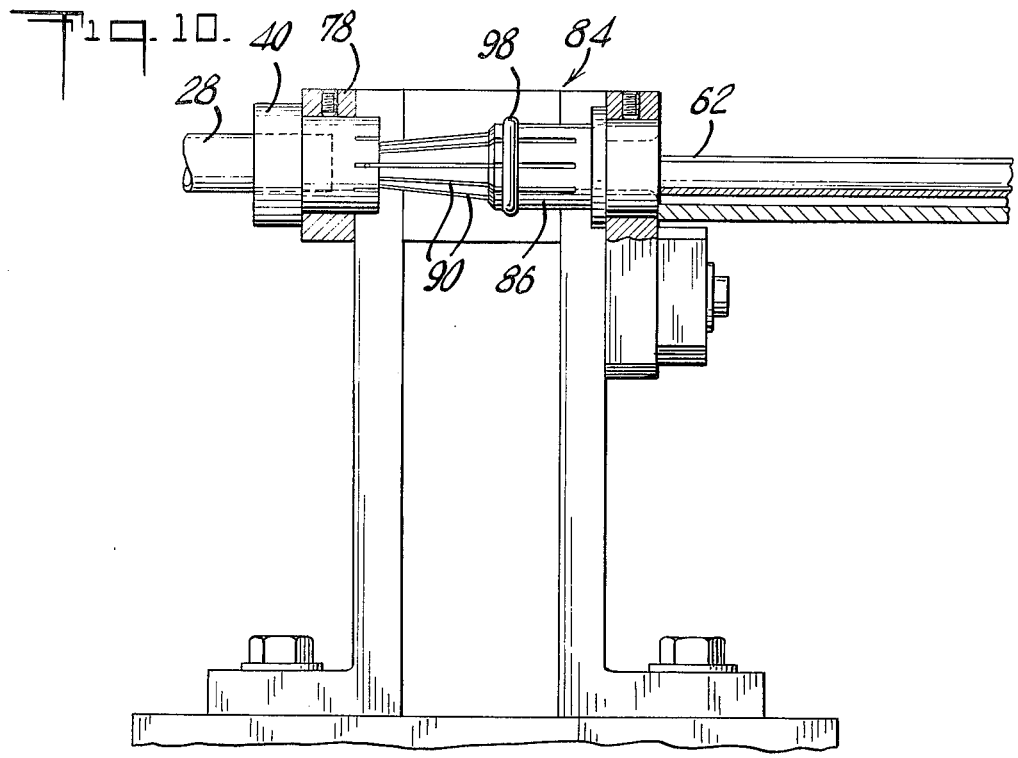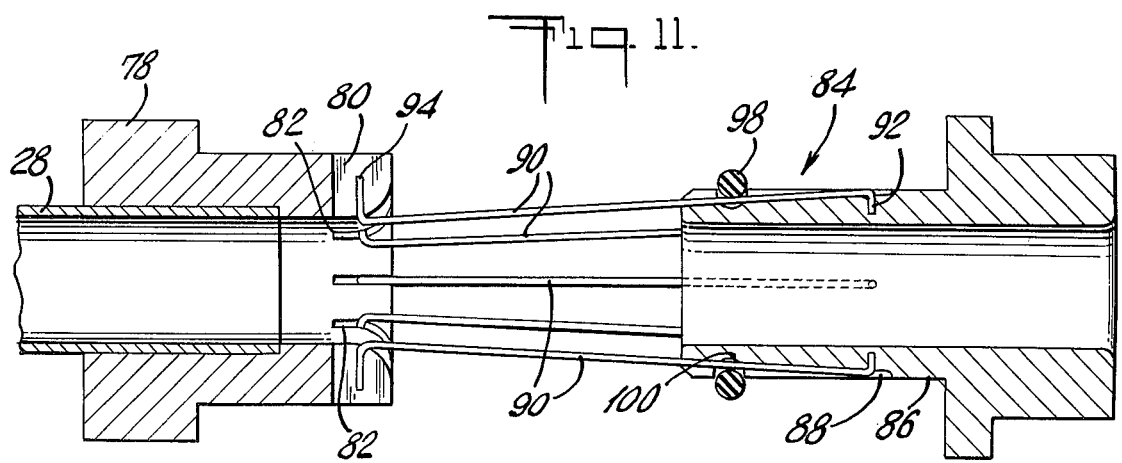

FUEL ROD PELLET LOADING ASSEMBLY

BACKGROUND OF THE INVENTION

In the nuclear field it is essential that in loading nuclear fuel pellets into fuel rods which make up the reactor to avoid chipping the pellets as they are loaded because of erratic heat transfer between the pellet and the zircaloy tubing. Pellets could also jam in the tube while being loaded because of loose chips. In loading these rods the fuel pellets generally are required to have a maximum of 0.007 inches total clearance. These pellets have sharp corners which are easily chipped and as mentioned above, it is desirable, if not essential, to prevent portions of the pellets from chipping as they are loaded into the rods and falling below or being pushed into the fuel rods. It is required that the loading operation of the fuel pellets into the fuel rods be carried out in an inert atmosphere because the moisture content of the pellets must be kept at an absolute minimum. Loading operations of nuclear fuel rods have heretofore been carried out in an open atmosphere and with some disregard to the pellet chipping problem, which has created a variety of problems such as erratic heat transfer, swelling and bursting of the zircaloy tube, and reactor shutdowns as a consequence.

Thus, it is seen that there exists a very real need for a fuel rod pellet loading assembly that will avoid and overcome the aforementioned problems.

SUMMARY OF THE INVENTION

To overcome the deficiencies and disadvantages of prior art fuel rod pellet loading techniques, according to a preferred embodiment of this invention there is provided an assembly including a glove box having an inert atmosphere and comprising facilities for weighing the total number of pellets to be placed into each fuel rod and measuring the overall length of these pellets when placed end to end. The glove box also includes at its loading end a block having a bore for receiving the open end of the fuel rod and a fuel pellet holder spaced from the block and carrying a spring member for bridging the space between the holder and the block. The spring member facilitates the loading of the pellets into the fuel rod. Any dust particles which may fall as the pellets are being loaded can be vacuumed with a small vacuum ring which may be located in the vicinity where the pellets enter the fuel rod. By employing the spring member for directing the fuel pellets into the rod, the problem of pellet chipping is minimized since any dust or UO₂ chips will fall through the finger openings of the spring. Also, the spring exit end can be regulated to bring about a smooth transition of the pellets from the loading fingers into the tube because the exit opening of the loading fingers is concentric with the tube or fuel rod opening.

Accordingly, it is a primary object of the present invention to provide a novel and improved loading assembly for use in the loading of nuclear fuel into fuel rods.

Having in mind the above and other objects and advantages that will be apparent from an understanding of this disclosure, the present invention comprises the construction and arrangements as illustrated in the presently preferred embodiments of this invention, which are hereinafter set forth in such detail as to enable those skilled in the art readily to understand the function, operation, construction and advantages of it when read in conjunction with the accompanying drawings.

BRIEF DESCRIPTION OF THE DRAWINGS

FIG. 1 is a top plan view, partially broken away, of a pellet loading and glove box arrangement according to the present invention;

FIG. 2 is an elevational view, partially broken away, of the pellet loading and glove box arrangement of FIG. 1;

FIG. 3 is a top plan view of the pellet-loader assembly employed in the arrangement of FIG. 1;

FIG. 4 is an elevational view of the pellet-loader assembly of FIG. 3;

FIG. 5 is a cross-sectional view taken substantially on the line 5—5 of FIG. 3;

FIG. 6 shows an alternate arrangement to that shown in FIG. 5;

FIG. 7 is a plan view of the length of the pellet loading insert employed in the pellet loader assembly;

FIG. 8 is an end view of the insert of FIG. 7 when formed in an operable configuration;

FIG. 9 is a cross-sectional view taken substantially on the line 9—9 of FIG. 8;

FIG. 10 is an alternate embodiment showing in elevation a different type of pellet loading insert employed in the pellet loader assembly; and FIG. 11 is an enlarged view of a portion of the pellet loader assembly of FIG. 10 illustrating details of the pellet loading insert.

DESCRIPTION OF THE PREFERRED EMBODIMENT

Having reference to the drawings wherein like parts are designated by the same reference numeral throughout the several views, the present invention is illustrated in FIG. 1 as comprising a suitable supported pellet loading and glove box 10 for receiving nuclear fuel pellets 12 from a vacuum furnace generally designated 14. Once the fuel pellets have been heated and subsequently cooled in the vacuum furnace, the racks or trays 16 are passed through the side wall of the glove box. Each rack contains a number of fuel pellets. On passing through the glove box the pellet-containing racks are placed on a roller conveyor 18 which has a plurality of rollers 20 disposed along the length thereof for facilitating movement of the racks. Within the glove box 10 there is provided an open-topped pellet trough 22 which is approximately 12 feet long corresponding to the length of the normal fuel rod. The trough which is capable of being moved to and fro in a horizontal plane, that is, from the position shown in FIG. 1 toward the front wall of the glove box. Movement of the trough 22 is accomplished by the operator using the gloves 24 mounted at glove ports 26 along the length of the glove box. This permits the operator to insert his hands into the gloves and manipulate the trough and/or the pellets in the desired manner, while still retaining the required inert atmosphere in the glove box. The trough is designed to be of such a length that it receives an entire load of nuclear fuel pellets for a single fuel rod or tube 28 which is to be loaded. The operator arranges the nuclear fuel pellets 12 by removing them from the racks 16 and placing them in end-to-end relationship in the trough 22. The entire load or charge for the fuel rod is then checked for proper length by comparing it with a reference length marked on the trough. Thereafter the balance 30 located at the pellet weighing station 32 is activated with the loaded trough disposed on it. The fuel charge is weighed and compared to the predetermined total weight for such a load, taking into account the known weight of the trough per se. If the length and/or weight deviates, appropriate corrective measures such as exchanging pellets of the proper weight and length with those from another tray of pellets kept at the weigh station for such purposes. This insures that each fuel rod receives the same amount of charge. After weighing, the loaded trough is moved forward and is placed upon the support members 34 located near the front wall of the glove box in substantial alignment with the fuel rod 28 to be loaded. Actual loading of the rod can now take place. The supports 34 are adjusted so that the trough 22 containing the pellets is properly aligned with the pellet loader assembly 36.

Referring now to FIGS. 3 and 4, wherein the pellet loader assembly 36 is illustrated in detail, the fuel rod 28, which is supported externally of the glove box by means of a support member 38 (see FIG. 2), is inserted into the glove box through a flexible iris diaphragm seal 40 in the side wall of the glove box. The tube is received in tube block 42 which has a bore 44 of such a diameter to form a sliding fit with the exterior of the fuel rod. This block is provided with longitudinally extending slots 43 for engagement with screws 45 to enable the block to be adjusted lengthwise. At the inner end of the block 42 there is secured by conventional means an annular stop member 46 having a central opening 48 of a diameter intermediate the inner and outer diameters of the fuel rod 28 (see FIG. 5). Thus, the fuel rod when inserted into the block 42 cannot be pushed completely through and will abut against the portion of the stop which extends radially inward of the bore 44.

As shown in FIG. 6, an alternative type of tube block may be provided. Thus, the tube block 50 has a pair of concentric bores 52 and 54, the latter being of a greater diameter than the former and situated at the trough or inner end of the block. Mounted within the larger and inner bore 54 is an annular elongated stop member 53 having a stepped configuration along its inner surface such that for a predetermined distance the inner diameter of the stop is the same as the inner diameter of the tube. This diameter extends to an abutment shoulder 58 whereupon the diameter is intermediate the tube inner and outer diameters for preventing further inward movement of the tube. The stops 9, FIGS. 5 and 6 also are provided with a rounded entry as shown at 60.

Spaced longitudinally or axially from the inner end of the tube block 42 is a pellet holder 62, which at one end near the fuel rod is provided with a pellet loading insert 64. This insert comprises a plurality of elongated tapered spring fingers 66 which when formed into an operable configuration, as shown in FIG. 9 for example, comprises a frustoconical array of spring fingers wherein the base 68 has an inner diameter which provides a sliding fit with the fuel pellets 12 received therein. The rear portion 70 of the holder 62 comprises an open trough similar in cross-section to the trough 22. The holder 62 may be vertically adjusted by means of adjusting screws 72 and wheel 74 by allowing the holder to be moved on the guides 76 which engage the bottom of the holder. As shown in FIGS. 3 and 4, the rear portion of the holder 70 is aligned with the trough 22 so that the fuel pellets (shown in dotted lines) may be pushed from the trough 22 into sliding engagement with the pellet loading insert 64 and through the spring fingers 66 into the fuel rod 28. The tips or extremities of the spring fingers just reach the end of the fuel rod tube as shown in FIGS. 3 and 4 and are designed to effect a smooth transition of the pellets into the fuel rod by locating the exit end of the insert concentrically relative to the fuel rod entry opening. The pellet insert end of the holder 62 can be vertically adjusted so that the insert is in concentric relationship with the fuel tube which facilitates the desired loading of the pellets. A small vacuum schematically illustrated at 76 may be provided beneath the space between the holder 62 and the tube block 42 for vacuuming up any dust particles which fall from the fuel pellets as they are loaded into the fuel rod.

The loading operation of the rod is accomplished by initially aligning the pellet loaded trough 22 with the holder trough 70 and pushing the pellets a foot or two at a time through the spring fingers of the insert into the fuel rod supported in the tube block 42. The spring fingers hold the pellets firmly in position and allow any dust or fragments which may be present to flake off. As previously discussed, if any of this dust or fragments enters the fuel rod it may present very undesirable characteristics of the reactor. This is so particularly if the fuel contains plutonium and is even more desirable to avoid when the fuel consists entirely of uranium oxide. The spring action of the pellet loading insert provides for a very smooth transfer to the fuel tube and substantially avoids any chipping of the pellets.

FIGS. 10 and 11 illustrate an alternate embodiment of the pellet loading insert which can be used in loading the pellets into the fuel rod. The tube holder 78 may be designed substantially the same as in the previous embodiments. As shown, the holder is like that shown in FIG. 6 except that at the end there is provided a support member 80 having a diameter corresponding to that of the adjacent holder bore and the inner diameter of the tube. This member 80 contains a plurality of arcuate radial openings 82 about its inner circumference the purpose of which will be described in detail hereafter. The pellet loading insert 84 in this embodiment comprises a member 86 supported by the insert holder 62 and having a plurality of peripherally disposed axial slots 88 of varying depth and radial openings or slots 96 for receiving a plurality of individual springlike members 90 having opposed ends 92 and 94 which mate with the slots 82 and 96 of the tube block and the holder, respectively. Once these spring members 90 have been inserted in place an O-ring 98 is inserted into a peripheral groove 100 formed near the outer end of the member 86 for retaining the springs in the desired configuration. It has been found that this embodiment has the advantage of being fabricated for less money where smaller quantities are involved than those previously mentioned while performing just as well.

It will be appreciated from the foregoing that there has been disclosed a novel and improved pellet loading assembly for nuclear fuel rods. However, it should be understood that the construction and arrangements herein illustrated and described are intended to be representative of only preferred embodiments and that certain changes readily may be made therein without departing from the clear teachings and scope of the present invention. Accordingly, reference should be made to the following appended claims in determining the full scope of this invention.

What is claimed is:

1. An assembly for the loading of nuclear fuel pellets into a fuel rod comprising in combination:
   a. a main housing having an inert atmosphere and adapted to receive fuel pellets for loading into fuel rods;
   b. a trough of predetermined length for receiving said pellets in end-to-end relationship;
   c. a weighing station including balance means for weighing said pellet-loaded trough;
   d. means for determining the length of said fuel pellets; and
   e. a pellet loader assembly disposed for alignment with said trough and said fuel rod, said trough arranged to longitudinally receive a predetermined load of said fuel pellets for passage from said trough through said assembly into said fuel rod, said pellet loader assembly comprising a tube supporting member and a fuel pellet holder member for longitudinally receiving said fuel pellets from said trough spaced from said tube supporting member to define a gap therebetween, and pellet loading insert means having a first circular pellet entry end and an opposite circular pellet exit end bridging said gap, said insert means carried at said pellet entry end by said fuel pellet holder member and in operable communication and axial alignment with said fuel rod at said pellet exit end for facilitating transfer of said fuel pellets from said pellet holder member into said fuel rod with a minimum amount of chipping of said pellets, said insert means comprising a plurality of spring-like fingers disposed in a circular array and tapered in the direction from said pellet entry end toward said pellet exit end.

2. The assembly of claim 1 wherein said pellet loading insert means comprises a unitary member having said spring-like fingers integral therewith.

3. The assembly of claim 1 wherein said pellet loading insert means comprises a frusto-conical configuration axially aligned with said fuel rod.

4. A pellet loader assembly for use in the loading of pellets into a rod comprising, in combination, means for supporting said rod and pellet holding means spaced a predetermined distance from said rod supporting means to define a gap therebetween and a pellet-carrying trough portion for substantial axial alignment with said rod, said pellet holding means including a pellet loading insert supported at one end by said pellet holding means and in operable communication with said rod at its opposite end for bridging said gap between said holding means and said rod supporting means to enable the transfer of pellets therebetween, said insert comprising tapered spring-like means having a circular opening of different size at each end thereof wherein the end of said spring means at the end closest said rod is adapted to be disposed in operable loading contact with the inner diameter of said rod.

5. The assembly of claim 4 wherein said insert comprises a frustoconical configuration.

6. The assembly of claim 4 wherein said insert comprises a circular array of fingers tapered in the direction away from said pellet holding means.

7. The assembly of claim 4 wherein said insert comprises a unitary member including a base for supporting a plurality of extended fingers.

8. The assembly of claim 1 wherein said tube supporting member includes abutment means for maintaining said fuel rod at a predetermined distance from the proximate end of said fuel pellet holder member.

9. The assembly of claim 8 wherein said abutment means comprises a shoulder extending radially inward of said tube supporting member for preventing said fuel rod from being pushed completely through said tube supporting member.

10. The assembly of claim 8 wherein said abutment means comprises a pair of coaxial bores of different diameter, the one of said bores closest said fuel pellet holder having a smaller diameter than the other of said bores.

11. The assembly of claim 4 wherein said means for supporting said rod includes abutment means for locating said rod therein at a predetermined distance from the proximate end of said pellet holding means.

12. The assembly of claim 4 wherein said pellet holding means comprises means for adjusting the alignment with said trough and for axially aligning said pellet loading insert relative to said fuel rod.

13. A pellet loading assembly for use in the loading of nuclear fuel pellets into a tubular fuel rod comprising, in combination, means for supporting said fuel rod, pellet holding means spaced a predetermined distance from said means for supporting said rod such that a gap is created therebetween, said pellet holding means including a trough for alignment with said fuel rod to facilitate the transfer of pellets from said trough to said fuel rod, said pellet holding means including a pellet loading insert having a pellet entry end and a pellet exit end disposed concentric relative with said fuel rod, said pellet loading insert secured at its pellet entry end to said pellet holding means and being tapered in the direction from said pellet entry end toward said pellet exit end for bridging said gap, said pellet loading insert comprising resilient means and having said pellet exit end in operable pellet loading contact with said nuclear fuel rod for avoiding a substantial amount of chipping of said fuel pellets during transfer from said pellet holding means to said fuel rod.

* * * * *